United States Patent [19]

Gadkaree et al.

[11] Patent Number: 5,275,766
[45] Date of Patent: Jan. 4, 1994

[54] METHOD FOR MAKING SEMI-PERMEABLE POLYMER MEMBRANES

[75] Inventors: Kishor P. Gadkaree, Big Flats; Leroy S. Hersh, Painted Post, both of N.Y.

[73] Assignee: Corning Incorporate, Corning, N.Y.

[21] Appl. No.: 968,661

[22] Filed: Oct. 30, 1992

[51] Int. Cl.$^5$ .................... B29C 67/20; B29C 71/00
[52] U.S. Cl. .......................... 264/22; 65/31; 156/643; 264/41; 264/210.3; 264/210.4; 264/211.19; 264/344
[58] Field of Search ............ 264/22, 41, 210.3, 210.4, 264/211.19, 340, 344

[56] References Cited

U.S. PATENT DOCUMENTS

| | | | |
|---|---|---|---|
| 3,992,495 | 11/1976 | Sano et al. | 264/22 |
| 4,046,843 | 9/1977 | Sano et al. | 264/22 |
| 4,521,236 | 6/1985 | Yamamoto et al. | 65/31 |
| 4,853,001 | 9/1989 | Hammel | 65/31 X |
| 5,043,369 | 8/1991 | Bahn et al. | 523/466 |
| 5,183,607 | 2/1993 | Beall et al. | 264/41 |

*Primary Examiner*—Leo B. Tentoni
*Attorney, Agent, or Firm*—Kees van der Sterre

[57] ABSTRACT

A method for making a semi-permeable microporous polymer sheet, useful as a separation membrane or the like, including extruding a melt-blended mixture of a high-temperature thermoplastic polymer and a leachable glass to form sheet and then leaching the glass from the sheet to leave a microporous relict polymer network, wherein the permeability of the sheet is improved by plasma-etching the surface of the sheet before or after leaching. Hydrophilic or hydrophobic porous membranes may be provided.

11 Claims, 1 Drawing Sheet

METHOD FOR MAKING SEMI-PERMEABLE POLYMER MEMBRANES

BACKGROUND OF THE INVENTION

The present invention relates to polymer membranes for separation processes, and more particularly to extrusion methods for making semi-permeable polymer membranes for separation processes from high temperature polymers.

The various filtration and/or separation processes utilizing porous membranes include concentration-driven separations such as dialysis, electromembrane separations, used to separate dissolved charged ions, and pressure-driven separations, including the familiar processes of micro-filtration, ultra-filtration, and hyper-filtration. Pressure-driven processes achieve the separation of suspended or dissolved particles of different sizes as the result of the capability of the particles to penetrate through or be retained by semi-permeable porous membranes of varying permeabilities and porosities. The porosity of the membrane determines whether the separation is termed micro-filtration, ultra-filtration or hyper-filtration.

Polymer membranes are used on a large scale in many industrial processes, including the desalination of sea water, the cleaning of industrial effluents, the fractionation of macro-molecular solutions in the food and drug industries, and the controlled release of drugs in medicine. Micro-filtration membranes are used for the filtration of particles in the 0.1-2 micron size range, whereas ultra-filtration membranes can trap particles in the 0.001-0.1 micron size range.

Composite membranes are also known, a common example being asymmetric ultrafiltration membranes comprising a thin particle-selective skin or surface membrane of fine porosity disposed for physical support on a backing plate of coarser porosity. Such composites improve mass transport in processes such as ultra-filtration and reverse osmosis, wherein very fine pore sizes must be provided.

Conventional methods for making microporous membranes include the sintered particle method, wherein powders of a selected membrane material are sintered to provide porous films or plates, typically with thicknesses in the 100-500 micrometer range. Ceramics, glasses, metals, and polymers such as polytetrafluoroethylene, can be formed into microporous membranes by this technique, although it generally yields structures of relatively low porosity, e.g., in the range of 10-40% by volume.

Alternative methods for making microporous polymer membranes include the stretching of homogeneous polymer films to cause partial fracture and the formation of a fine pore structure therein, and irradiation methods wherein films are irradiated with charged atomic particles and then etched to enlarge the particle tracks therein to pores. Also used is a phase inversion process wherein an immiscible liquid is introduced into a thin liquid film of a polymer solution, and the polymer then precipitated as a polymer film comprising a network of pores resulting from the presence of the immiscible phase during precipitation.

The above-described chemical methods for membrane fabrication generally use polymers that can be etched or otherwise dissolved in controlled fashion, and therefor are inherently limited to polymers which have some solubility in organic solvents. This limits the durability of the membranes which can be provided.

In a relatively recent development, a method for providing semi-permeable membranes from high strength, high temperature polymers such as polyether ketones, poly(aryl ether) ketones, and liquid crystal polymers has been developed. That method involves melt-blending a batch mixture containing a finely divided high-temperature polymer and a finely divided leachable glass to form a two-phase glass-polymer blend comprising continuous glass and continuous polymer phases.

The blend thus provided is then formed into a glass-polymer body of a selected shape such as a plate or membrane, and then treated with an aqueous leaching medium to leach the continuous intercommunicating glass phase from the continuous polymer phase. The product is a microporous polymer body comprising an intercommunicating pore structure consisting of a relict polymer network, generally having a pore volume in excess of 50% and average pore diameters in the range of about 0.1-10 micrometers. Most typical porosities are in the range of 70 to 80% by volume, with mean pore sizes of 0.1 to 0.7 microns and a narrow pore size distribution.

The method described above is disclosed and claimed in a copending, commonly assigned patent application of G. H. Beall et. al., Ser. No. 808,814 filed Dec. 17, 1991 for "Polymer Membranes for Separation Processes", now U.S. Pat. No. 5,183,607, and that patent is expressly incorporated herein by reference for a further description of such products and methods.

The method of the above-described patent application provides membranes of excellent quality, particularly when the membranes are produced by pressing of the glass-polymer blend followed by leaching of the resulting sheets or films. However, it has recently been found that membranes produced by extrusion of the glass-polymer blends followed by leaching exhibit significantly lower permeability than membranes of same composition produced from pressed films. Hence, although glass removal from the films appears to be substantially complete, with polymer residues and leached film densities essentially equivalent to those obtained in the case of pressed films, the extruded products still differ substantially from the pressed products in terms of permeability.

This represents a significant problem because extrusion is a preferred method for the production of melt-blended glass/polymer film precursors, particularly for applications requiring large quantities of semi-permeable membrane materials. Hence, extrusion can most conveniently provide large quantities of film material at low cost, in uniform thickness, and with relatively high film quality. Accordingly, a method for extruding blended thin-film material films which would provide products with properties equivalent to those of pressed plates or films is needed.

It is therefore a principal object of the present invention to provide an improved method for the production of semi-permeable microporous membranes utilizing extrusion processing.

It is a further object of the invention to provide an extrusion method which provides semi-permeable microporous membranes of controllable permeability on a repeatable basis.

Other objects and advantages of the invention will become apparent from the following description thereof.

SUMMARY OF THE INVENTION

In accordance with the present invention the problem of low permeability in extruded microporous membranes has been identified, and an improved process for manufacturing such membranes which overcomes this problem has been developed. More particularly, it has now been found that, when continuously extruding thin sheets of blended glass-polymer blend material of the kind required for porous membrane manufacture, there is a strong tendency for excess polymer to collect near the outermost region of the extrusion die. This excess then forms a glass-deficient, polymer-rich skin on the surface of the extruded film, i.e., a film which is only marginally penetrated by glassy phase material present in the interior of the film.

As a consequence of this effect, while the glass can still be leached from the sheet to provide a microporous membrane product, and the product can exhibit a normal pore size and pore size distribution within the interior of the film, the surface of the film retains only a low level of porosity, due to the polymer-rich layer thereon. This layer thus acts like an artificial barrier, restricting permeation of the film by species of a size which would ordinarily exhibit rapid transport into and through the film.

In addressing this problem we have discovered that plasma etching of the film surface, either before or after the removal of glassy phases by leaching, can restore the permeability of the leached film to normal values. Further, we have found that such etching provides additional benefits in terms of controlling the hydrophobicity of the film surface and, optionally, the pore size and pore size distribution in the porous polymer material adjacent the surface of the film.

In accordance with the method of the invention, then, a semi-permeable microporous polymer sheet having an intercommunicating pore structure is made by a process which comprises, first, blending a batch mixture of a thermoplastic polymer and a finely divided leachable glass to form a two-phase glass-polymer blend material. This blended material is then extruded through a die to form a blended sheet, the sheet being characterized in that it comprises a continuous polymer network and an intercommunicating glass phase throughout the interior of the sheet.

After the sheet has been formed it is leached to remove the intercommunicating glass phase therefrom, this readily being accomplished without disruption of the polymer network. A microporous polymer sheet composed of the relict polymer network is provided. However, in order to achieve the desired permeability in the extruded sheet, the sheet surface is subjected to a plasma etching step, carried out either prior to or subsequent to the leaching step.

In the plasma etching step the sheet surface is exposed to a plasma of an energy at least sufficient to etch thermoplastic polymer from the sheet surface, with exposure being continued for a time at least sufficient to increase the area of leachable glass, or the area of intercommunicating pore structure, exposed at the sheet surface.

The product of this process is a microporous sheet wherein the surface porosity can be closely controlled. Thus it may be at least equivalent to the sheet interior with respect to pore volume and pore diameter, although lesser or greater pore volumes and diameters may also be provided.

DESCRIPTION OF THE DRAWINGS

The invention may be further understood by reference to the drawing, wherein.

DETAILED DESCRIPTION

Figure 1:
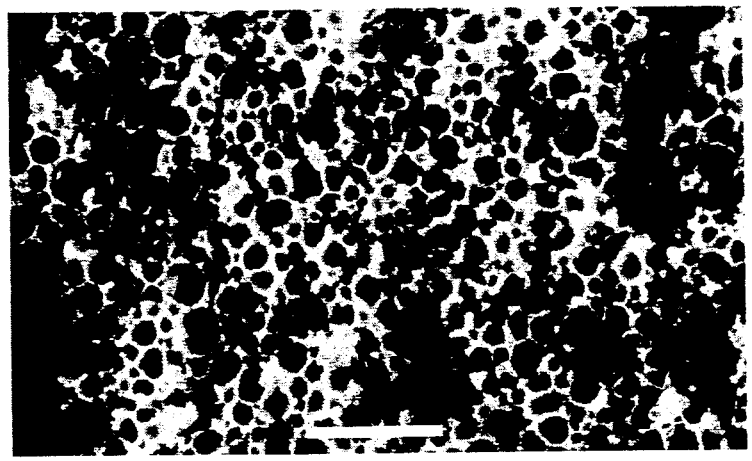
FIG. 1 is an electron photomicrograph of an interior fracture surface of an extruded leached microporous sheet.

The blending of glasses with high temperature polymers to provide composite materials having properties intermediate those of the glasses and plastics is well known from U.S. Pat. No. 5,043,369 to Bahn et al. As disclosed in that patent, such blends can be made by high shear dispersive mixing of glass/polymer batches comprising finely divided glass and polymer batch materials, with the preferred mixing technique consisting of high shear screw-type extrusion such as provided by twin-screw extruders commonly used in the polymer industry.

To provide extruded sheet of a microstructure suitable for porous membrane manufacture, the polymer and glass batch materials selected for such processing must be of a character such that a continuous polymer network within the glass/polymer blend can be maintained. This is done by selecting blend components, mixing conditions, and a glass/polymer volume ratio adequate to develop the desired polymer network and interconnecting dispersion of the glass in the polymer.

Typically, the proportion of glass used for porous membrane production is in the range of about 65-95% by weight of the mixture, with the polymer making up the remaining 5-35% by weight thereof. Also, glasses which are non-wetting with respect to the polymers are used, so that contacting droplets of the glass can be formed within the polymer during the mixing of the materials.

Among the polymers particularly useful for membrane production in accordance with the present process are polyether ether ketones (PEEK polymers), poly(aryl ether) ketones (PAEK polymers), polyether ketones (PEK polymers), polyether amides, polyether sulfones (i.e., polysulfones), and liquid crystal polymers. Examples of specific liquid crystal polymers which are particularly preferred for the manufacture of porous products in accordance with the invention include copolymerized p-hydroxybenzoic acid/hydroxynapthoic acid monomer mixtures, commercially available as VECTRA TM liquid crystal polymers from the Hoechst-Celanese company of Shelby, N.C., and copolymers of terephthalic acid with p-p$^1$-dihydroxy biphenyl, p-hydroxy benzoic acid, commercially available as XYDAR TM liquid crystal polymers from Amoco Performance Products company of Augusta, Ga.

The above high-temperature polymers can be used alone or in any compatible combination, or they may be used with additions of other polymers, such as the fluoropolymers. The only limitation on polymer blending is that sufficient polymer intercompatibility be present to provide for good polymer network formation during the melt-blending process.

It is normally preferred, however, that the polymer or polymer mixture comprise at least about 90 weight percent of high-temperature polymers, with less durable polymers comprising only minor additions thereto. Most preferably, the products will consist essentially of high temperature polymers only, with little or no additions of other polymers.

Representative examples of durable high-temperature polymers useful for the extrusion of sheet for porous membranes in accordance with the invention are set forth below. Heat distortion and strength data for selected polymers are also reported.

TABLE I

| Polymer Type | Durable Polymers Heat Distortion Temperature (°F.) | Strength |
|---|---|---|
| Polysulfone | 340° | 5000–6000 psi |
| Polyether ketone (PEK) | 367° | 15,000 psi |
| Polyether-ether ketone (PEEK) | 320° | 10,000–15,000 psi |
| Liquid Crystal Polymer | 639–671° | 18,000–20,000 psi |

Glasses to be selected for blending with the described durable polymers are those exhibiting the quality of rapid dissolution in aqueous media, although extremely non-durable glasses, such as glasses exhibiting hygroscopic behavior, are generally avoided. Hygroscopic glasses spontaneously absorb water from the atmosphere, and thus have a sticky character which makes them difficult to process.

The selected glass should also have a viscosity comparable to that of the selected high temperature polymer during mixing, so that high loadings of the glass, sufficient to develop a continuous or interconnecting glass phase in the polymer, can be realized. Examples of known glass families exhibiting both water solubility and low melting temperatures are the alkali phosphates, including the so-called metaphosphate and ultraphosphate glasses, as well as certain of the known borate, halide, oxyhalide, and halophosphate glasses.

The alkali phosphate glasses, which are preferred, may selected from a broad range of composition, including glasses comprising, in mole percent, about 35-70% $P_2O_5$, 25-65% $R_2O$, wherein R is at least one alkali metal selected from the group consisting of sodium, potassium and lithium, and 0-10% of oxides selected from the group consisting of $Al_2O_3$ and $B_2O_3$. Halophosphate glasses exhibiting particularly good water solubility include those comprising, in mole percent, about 25-55% $P_2O_5$, 10-40% $R_2O$, wherein R is at least one alkali metal selected from the group consisting of sodium, potassium and lithium, and 10-40% $ZnCl_2$. The glass transition temperatures exhibited by these glasses can range from as low as 190° C. to 360° C. or higher.

Particularly preferred glasses include alkali phosphate and alkali aluminophosphate glasses consisting essentially, in mole percent, of about 40-55% $P_2O_5$, 45-55% $R_2O$, wherein R is at least one alkali metal selected from the group consisting of sodium, potassium and lithium, and 0-10% of $Al_2O_3$, these glasses exhibiting glass transition temperatures in the 200°-350° C. range in combination with excellent water solubilities and melt viscosities.

Table II below sets forth examples of glass compositions of preferred type, including proportions of constituents in mole percent and glass transition temperatures ($T_g$) in degrees Celsius. Weight percent compositions for each of these glasses are provided in Table IIb.

Table II - Leachable Alkali Phosphate Glasses

TABLE IIa

| Oxide | Mole Percent Compositions | | | | |
|---|---|---|---|---|---|
|  | 1 | 2 | 3 | 4 | 5 |
| $P_2O_5$ | 46.05 | 45.98 | 45.95 | 48.07 | 50.07 |
| $Al_2O_3$ | 3.98 | 4.04 | 4.03 | 1.99 | — |
| $Li_2O$ | 24.94 | — | 25.06 | 24.93 | 24.92 |
| $Na_2O$ | 25.03 | 24.98 | — | 25.01 | 25.01 |
| $K_2O$ | — | 25.00 | 24.96 | — | — |

TABLE IIb

| Oxide | Weight Percent Compositions | | | | |
|---|---|---|---|---|---|
|  | 1 | 2 | 3 | 4 | 5 |
| $P_2O_5$ | 70.7 | 60.2 | 65.0 | 73.1 | 75.5 |
| $Al_2O_3$ | 4.4 | 3.8 | 4.1 | 2.18 | — |
| $Li_2O$ | 8.1 | — | 7.5 | 8.02 | 7.95 |
| $Na_2O$ | 16.8 | 14.3 | — | 16.63 | 16.49 |
| $K_2O$ | — | 21.7 | 23.4 | — | — |
| $T_g$ (°C.) | 290° | 260° | 280° | 263° | 240° |

To provide the melt-blended material for sheet extrusion in accordance with the invention, finely divided (powdered) glass and polymer batch materials are preferably used. Glass powders with particle sizes in the range of about 12-20 mesh (U.S. Standard Sieve) typically provide desirable dispersion of the glass phase in the polymer within a relatively short processing interval. Desirably both the glass and polymer powders are dried overnight at in a hot air oven at temperatures in the 150° C. range prior to blending.

Blending is best achieved by high-shear mixing and pre-extrusion of the melt-blended material, typically by means such as twin screw extrusion or similar high-shear polymer blending process, since such can conveniently provide both high temperatures and high applied torque to the blends. Blending temperatures in the range of 350°-400° C. are preferred for the particular phosphate glasses and liquid crystal polymers above described, these temperatures yielding glass and polymer viscosities permitting thorough mixing and the development of a finely divided and fully dispersed interconnecting glass phase in the initial extrudate in these composition systems. Of course the best blending conditions for achieving a particular volume fraction of porosity, mean pore size, and pore morphology for each glass/polymer combination are easily determined by routine experiment.

Extrusion of the melt-blended material to provide sheets suitable for the manufacture of porous membrane products in accordance with the invention is conveniently achieved using conventional extrusion equipment adapted for film extrusion. Typical temperatures used for sheet forming will be in the range of about 300°-400° C. for the preferred materials, although the particular temperatures and pressures developed in the sheet extrusion step will of course vary depending upon the particular viscosities and other forming characteristics of the glass-polymer blend being processed.

Removal of the glass phase from extruded sheets provided as described is conveniently accomplished simply by contacting the sheet with heated (e.g., 70°-80° C.) water or other aqueous media. Strongly acidic or basic solutions can be used but are generally not required for glass removal, and room temperature leaching, although somewhat slower than hot leaching, is also effective.

Either prior to or after leaching of the extruded sheet has been accomplished, the sheet will be exposed to a plasma for the purpose of etching polymer material from the surface thereof. This process may follow conventional plasma etching practice, the plasma selected for etching depending upon the particular polymer employed and the degree of polymer removal desired. Examples of plasma types which may be effective to remove surface polymer from these sheets include plasmas of oxygen, air, H2O, N2O, hydrogen, and ammonia.

The most effective plasma energies useful for surface etching in accordance with the invention can readily be determined by routine experiment, depending primarily upon the rate of surface removal desired for a particular process. Of course, excessive plasma energies causing undue heating and/or charing of the sheet surface are to be avoided; we anticipate that plasma energies in the range of 20-300 W should provide an adequate rate of polymer removal without risk of surface damage to the polymers presently preferred for extruded sheet fabrication.

In the present process, the preferred plasma etching step is one wherein the extruded sheet is exposed to an oxygen plasma. Whether carried out prior to or after leaching, an oxygen plasma can effect a very rapid removal of polymer from the surface of the sheet. In addition, when carried out subsequent to the leaching step, oxygen plasma etching can significantly alter the wetting characteristics of the polymer network at and adjacent to the porous surface of the etched sheet.

In particular, the surfaces of the porous sheet, including the pore walls of pores near the sheet surface, are converted from substantially hydrophobic to substantially hydrophilic surfaces through the action of the oxygen plasma on those surfaces. We presently attribute this to the oxidation, by the oxygen plasma, of polymer bonds on the surface and within the surface pore structure of the sheet. This results in the generation of polar groups on the sheet surface which convert it from a hydrophobic to a hydrophilic character.

On the other hand, this effect is not observed in significant degree when plasma etching is carried out prior to the leaching of the intercommunicating glass phase from the sheet. In that case, the plasma does not gain access to the interior surfaces of surface pores on the sheet, due to the presence of the glass phase therein during the etching process. The surface oxidation which does accompany plasma etching at this stage is not sufficient to change the fundamental hydrophobic nature of the porous surface subsequently developed on leaching.

The invention may be further understood by reference to the following detailed Example showing the fabrication of a microporous membrane in accordance therewith.

EXAMPLE

A glass-polymer blend suitable for extrusion into a thin sheet or film is first compounded. The batch for the blend comprises powdered glass component and a liquid crystal polymer component, the polymer component consisting of a combination of a liquid crystal polymer and a PAEK high-temperature polymer.

The liquid crystal polymer making up the polymer component consists of a copolymerized p-hydroxybenzoic acid/hydroxynapthoic acid monomer mixture commercially available as VECTRA TM liquid crystal polymer powder from Hoechst-Celanese Corporation of Chatham, N.Y. The high-temperature PAEK polymer consists of a polyarylether ketone high temperature polymer commercially available as Kadel TM (E-1000) polymer powder from Amoco Performance Products Inc. of Ridgefield, Conn.

The glass component consists of a powdered aluminophosphate glass having a composition, in weight percent, of about 73.1% $P_2O_5$, 2.18% $Al_2O_3$, 8.02% $Li_2O$, and 16.63% $Na_2O$. This glass was melted at 1000° C. in a silica crucible, cast into glass patties, and then crushed and ground to provide glass powder of −20 mesh (U.S. Standard Sieve) particle size.

The batch for the blend is compounded by mixing together, in parts by weight, 80 parts of powdered glass, 15 parts of the Vectra TM polymer, and 5 parts of the Kadel TM polymer. Melt-blending of this batch is then carried out by mixing and extrusion using a Leistritz twin screw extruder with co-rotating screws, with mixing zone and die temperatures of 350° C. being maintained throughout this process. Extrusion is through a strand extrusion die with ⅛-inch (3.2 mm) orifice, the compounded strand being pelletized by chopping to ¼-inch (6.35 mm) pellets after extrusion.

The melt-blended pellets produced as described are next formed into a thin extruded sheet (film). Extrusion is carried out using a Davis-Standard single screw extruder fitted with a sheet extrusion die having an eight-inch (20 cm) slot length and a slot width of 0.025 inches (0.63 mm). Heating of the pellets in the extruder takes place by transport of the pellet feed through first, second and third successive heating zones, maintained at temperatures of 250°, 330° and 330° C., respectively. Die temperature during the extrusion is maintained at 340° C., with continuous extruded film of 0.025-inch thickness readily being extruded by this process.

The extruded film thus obtained is next leached in water at 70° C. for a 16-hour interval to remove the continuous glassy phase from the polymer network forming the film. Following leaching, samples of the leached film are fractured and the microstructure of the surfaces and interior of the film are then examined.

The interior of the film has a microstructure substantially equivalent to that observed in the case of pressed leached melt-blended sheet. FIG. 1 of the drawing is a scanning electron photomicrograph of the leached film cross-section wherein the white bar represents a dimension of 10 micrometers. The highly porous character of the polymer network remaining after leaching is readily evident from this photomicrograph.

Figure 2:
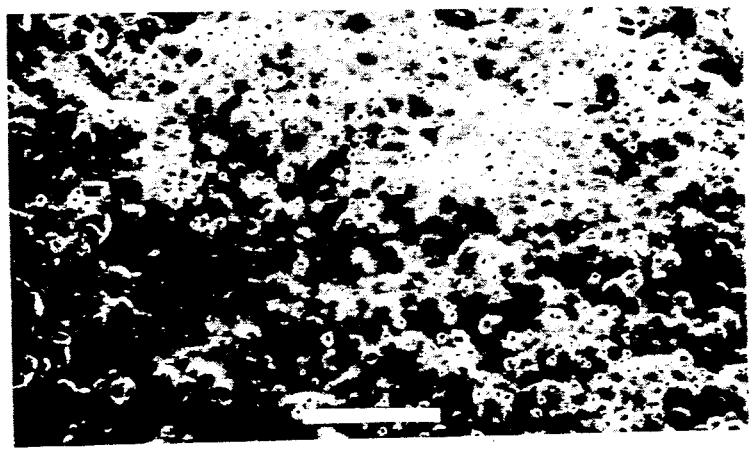
FIG. 2 is an electron photomicrograph of an exterior surface of an extruded leached microporous sheet.

Examination of the surface of this leached film, however, reveals a polymer skin with relatively low porosity. FIG. 2 of the drawing is a scanning electron photomicrograph of the surface of the leached film shown in FIG. 1, wherein the white bar again represents a dimension of about 10 micrometers. The very significant difference in porosity between this surface layer and the interior of the sample as illustrated in FIG. 1 is evident.

To modify the porosity of the surface of the extruded film to better comport with the highly porous structure of the interior of the film, samples of the film are subjected to a plasma etching process. This plasma etching step is carried out in a March Plasmod table-top plasma reactor, commercially obtained from March Instruments Inc. of Concord, Calif. 94520. The plasma used for etching is an oxygen plasma, generated at an applied power level of about 80 watts, the samples being exposed to this plasma for etching times in the 30-second to 5-minute range.

Figure 3:
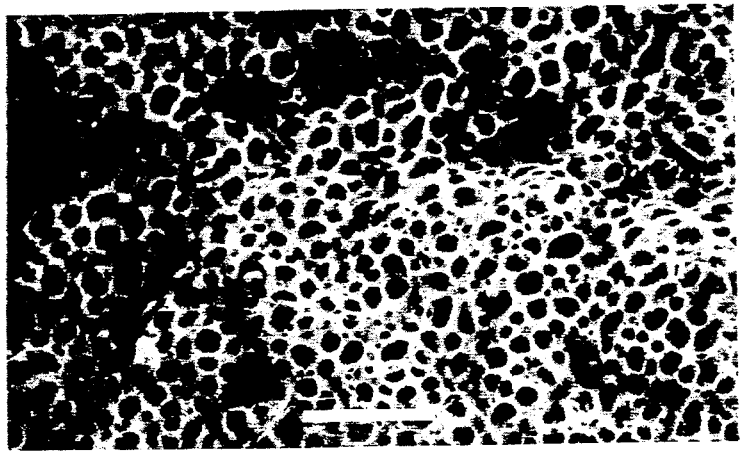
FIG. 3 is an electron photomicrograph of an exterior plasma-etched surface of an extruded leached microporous sheet.

The effect of exposure to this plasma is to rapidly open the polymer surface of the extruded film to a porosity level at least equivalent to that of the film interior. FIG. 3 of the drawing is an electron photomicrograph of the surface of an extruded and leached film such as illustrated in FIG. 2 of the drawing, after exposure to the described oxygen plasma for approximately one minute. The white bar in the micrograph again corresponds to a dimension of about 10 micrometers.

As is evident from a study of FIG. 3, a highly porous surface is provided on the film treated as described in the course of the plasma etching treatment. Further, it is found that this film exhibits relatively strong hydrophilic behavior, in strong contrast to the behavior of porous pressed films which have been similarly leached but not plasma etched.

As previously noted, similar results in terms of restoring sheet surface porosity may be achieved by carrying out essentially the same plasma etching treatments on films which have been extruded but not yet leached. Similar etching conditions and times may be used for this purpose, with similar levels of surface porosity restoration being observed following a subsequent leaching of the intercommunicating glass phase from the extruded sheet. Hence, in the cases of both the leached and the unleached films, shallow protrusions on the surface of the extruded films, caused by the presence of glassy inclusions therein during extrusion, appear to be preferentially etched in these plasmas, such that a very rapid removal of polymer material from incipient or actual pore sites adjacent the surface material will occur.

Significantly, carrying out the plasma etching prior to the removal of glass from the extruded sheet may be preferred for some applications, e.g., where retention of a strong hydrophobic property in the film surface is desired. On the other hand, plasma etching subsequent to leaching, in addition to imparting hydrophilicity to the sheet surface, can if continued effect an opening of the surface pores in a manner which will increase the average pore diameter and pore volume near the surface of the sheet.

This latter effect can be quite useful in the production, for example, of anisotropic membranes. These are membranes with large pore sizes on one surface and smaller pores on the opposing surface. The shielding of one surface of the extruded sheet during at least a portion of the plasma treatment is an effective way to increase the pore size differential between the opposing surfaces of such anisotropic membranes.

From the foregoing description it will be evident that, while the invention has been particularly described with respect to specific examples of compositions, materials, apparatus and/or procedures, those examples are presented for purposes of illustration only and are not intended to be limiting. Thus numerous modifications and variations upon the compositions, materials, processes and apparatus specifically described herein may be resorted to by those skilled in the art within the scope of the appended claims.

We claim:

1. A method for making a semi-permeable microporous polymer sheet having an intercommunicating pore structure which comprises the steps of blending a batch mixture of a thermoplastic polymer and a finely divided leachable glass to form a two-phase glass-polymer blend material, extruding the glass-polymer blend material through a die to form a sheet having a sheet surface and comprising a continuous polymer network and an intercommunicating glass phase, and thereafter leaching the intercommunicating glass phase from the sheet without disruption of the polymer network, wherein:

prior to or subsequent to leaching, the sheet surface is exposed to a plasma of an energy at least sufficient to etch thermoplastic polymer from the sheet surface, for a time at least sufficient to increase the area of leachable glass or intercommunicating pore structure exposed at the sheet surface, thus to provide a microporous polymer sheet having an intercommunicating pore structure.

2. A method in accordance with claim 1 wherein the polymer is composed at least predominantly of a high-temperature polymer selected from the group consisting of polyether ketones, polyether amides, polysulfones, liquid crystal polymers, and mixtures, copolymers or other combinations thereof.

3. A method in accordance with claim 2 wherein the batch mixture comprises about 65-95% of glass and 5-35% of polymer by weight, and wherein the leachable glass is selected from the group consisting of alkali phosphate, borate, halophosphate, halide and oxyhalide glasses.

4. A method in accordance with claim 3 wherein the leachable glass is a halophosphate glass comprising, in mole percent, about 25-55% $P_2O_5$, 10-40% $R_2O$, wherein R is at least one alkali metal selected from the group consisting of sodium, potassium and lithium and 10-40% $ZnCL_2$.

5. A method in accordance with claim 3 wherein the leachable glass is an alkali phosphate glass comprising, in mole percent, about 35-70% $P_2O_5$, 25-65% $R_2O$, wherein R is at least one alkali metal selected from the group consisting of sodium, potassium and lithium, and 0-10% of oxides selected from the group consisting of $Al_2O_3$ and $B_2O_3$.

6. A method in accordance with claim 5 wherein the alkali phosphate glass has a glass transition temperature in the range of about 200°-350° C. and a composition which consists essentially, in mole percent, of about 40-55% $P_2O_5$, 45-55% $R_2O$, wherein R is at least one alkali metal selected from the group consisting of sodium, potassium and lithium, and 0-10% of $Al_2O_3$.

7. A method in accordance with claim 1 wherein the plasma comprises an element, mixture or compound selected from the group consisting of oxygen, air, $H_2O$, $N_2O$, hydrogen, and ammonia.

8. A method in accordance with claim 7 wherein the plasma comprises oxygen.

9. A method in accordance with claim 7 wherein the sheet surface is exposed to the plasma prior to leaching.

10. A method in accordance with claim 8 wherein the sheet surface is exposed to the plasma subsequent to leaching.

11. A method in accordance with claim 1 wherein the polymer is composed at least predominantly of a polymer selected from the group consisting of polyether ketones.

* * * * *